United States Patent [19]

Popov et al.

[11] 4,180,156

[45] Dec. 25, 1979

[54] DEVICE FOR HANDLING FLASKLESS MOULDS

[76] Inventors: Alexei I. Popov, ulitsa Geroev Truda, 29, kv. 267; Vladimir D. Pepenko, pereulok Maryanenko, 1, kv. 9; Jury G. Vinjukov, ulitsa Mayakovskogo, 11, kv. 15; Leonid I. Matjurin-Veretennikov, ulitsa Timurovtsev, 17, kv. 19; Vladimir M. Stepanov, Pavlovo-pole, 5 mikroraion, 75, kv. 14; Viktor G. Grubman, ulitsa Dzerzhinskogo, 65, kv. 24, all of Kharkov, U.S.S.R.

[21] Appl. No.: 808,651

[22] Filed: Jun. 20, 1977

[51] Int. Cl.$^2$ .............................................. B65G 15/20
[52] U.S. Cl. .................................... 198/726; 164/323; 198/626
[58] Field of Search ............... 198/479, 626, 627, 628, 198/726, 842; 164/322, 323, 187

[56] References Cited

U.S. PATENT DOCUMENTS

| 3,143,269 | 8/1964 | Van Eldik | 198/626 |
|---|---|---|---|
| 3,338,380 | 8/1967 | Grebe | 198/842 |
| 3,556,196 | 1/1971 | Buhler | 164/187 |
| 3,744,552 | 7/1973 | Lundsgart | 164/187 |
| 3,958,621 | 5/1976 | Hatch | 164/187 |
| 4,079,551 | 3/1978 | Bando | 198/626 |

Primary Examiner—Jeffrey V. Nase
Attorney, Agent, or Firm—Fleit & Jacobson

[57] ABSTRACT

A device for handling flaskless moulds relates to foundry equipment and can prove to be most advantageous for use in automatic lines for flaskless horizontal-stack moulding. The device of this invention comprises a stationary bed adapted for arranging moulds, and a mechanism or gear for moving the moulds assembled into a stack. The gear is made as two sprocket endless chains running from both sides of the stationary bed concordantly thereto and carrying grips for retaining a stack of flaskless moulds during its travel along the stationary bed. The top horizontal portions of the chains are provided with guides adapted to draw these portions together above the bed. As a result, smooth bringing of the grips to and from the stack is performed. The above embodiment of the gear enables relatively inexpensive moulding sands to be used and provides an increase in metal capacity of the moulds which retain their intactness, this enhancing the economic efficiency of flaskless moulding and adding to the productivity of foundry equipment.

6 Claims, 8 Drawing Figures

DEVICE FOR HANDLING FLASKLESS MOULDS

The present invention relates to foundry equipment and more particularly to devices for handling flaskless moulds.

The device of the present invention may prove to be most advantageous for use in automatic lines for flaskless horizontal-stack moulding with the moulds being splitted vertically in the mould pouring and casting solidification section.

Known in the prior-art are devices for handling flaskless moulds (see, e.g., GFR Pat. No. 2,039,725, Cl.B65 c-17/46 ICI, 1970), comprising a stationary bed adapted for arranging flaskless moulds assembled into a horizontal stack, and a mechanism or gear for moving said stack along the bed.

In these prior-art devices the gear for moving a mould stack comprises grips made in the form of two straps running from both sides of the stationary bed all along the stack. The grips are designed so that they are provided with the possibility of moving said stack of flaskless moulds along the bed a distance equal to one mould thickness. To accomplish this travel the grips are urged to the lateral sides of the stack with an effort sufficient to overcome friction forces, arising between the mould stack and the stationary bed.

Next the stack is released from the grips which return to their initial position. When a next mould is fed to the stack, the operation cycle of the grips is repeated. Thus, each mould in the stack is periodically squeezed by the grips all the way long when it is being handled along the bed, the number of said squeezings being equal to the number of the moulds in each stack. This pulsating load applied to the moulds during their handling may lead to their breakage. Moreover, in the course of pouring said moulds, the moisture contained in a moulding sand, of which the moulds are made, is redistributed. In a layer abutting a casting the moisture evaporates, with the resulting vapours being condensed in cold layers of said mould. In view of increased moisture contents of these layers the mould strength diminishes as compared with its initial value. And further, taking into account that a mould stack is handled by said prior-art gear with the stack sides being deprived of permanent support (jacketing), the above-described conditions may often result in mould breakage.

Under these conditions for the moulds to be capable of withstanding the head of metal during the pouring operation, it is necessary either to increase their strength or to decrease the mould area occupied by a pattern impression, i.e. their metal capacity.

It is commonly known that an increase in the mould strength calls for special-purpose expensive moulding sands featuring a high compression strength (from about 1.5 kgF/cm$^2$ and upwards), while a reduced metal capacity of the moulds causes the productivity of moulding equipment to be brought down.

The main object of the present invention is to provide a proper strength of flaskless moulds during their filling with metal and solidification of castings.

Another object of this invention is to increase the mould area occupied by a pattern impression, i.e. the metal capacity of the mould. All the above outlined enables moulding sands featuring a comparatively low compression strength to be used, which will enhance substantially economic efficiency of flaskless moulding and add to the productivity of moulding equipment.

Said and other objects are achieved in a device for handling flaskless moulds, comprising a stationary bed adapted for arranging flaskless moulds assembled into a horizontal stack, and a mechanism or gear for moving said stack along the bed. According to the invention, in the herein-proposed device for handling flaskless moulds the gear for moving a stack of flaskless moulds is made as two sprocket chains running from both sides of the stationary bed concordantly thereto and carrying grips for retaining the stack during its travel along the bed, with the top horizontal sections of said chains being provided with guides adapted for drawing said chain sections together above the stationary bed, the result being bringing the grips smoothly to and from the stack.

The invention consists essentially in that in a device for handling flaskless moulds, comprising a stationary bed adapted for arranging the flaskless moulds asssembled into a horizontal stack, and a gear for moving said stack along the bed, according to the invention, the gear for moving a stack of flaskless moulds is made in the form of two sprocket endless chains running from both sides of the stationary bed concordantly thereto and carrying grips for retaining the stack of flaskless moulds during its travel along the stationary bed. The top horizontal portions of said chains are provided with guides adapted for drawing these chain portions together above the bed with the ensuing smooth bringing of said grips to and from the stack.

Such an embodiment of the gear for moving a stack of flaskless moulds along the stationary bed enables the stack of said flaskless moulds to be constantly retained during their travel along the stationary bed, obviating thereby pulsating loads on the moulds and providing a constant support (jacketing) for the flaskless moulds from their lateral sides while pouring metal into said moulds and during the process of crystallization of castings. This protects the moulds against breakage, providing thereby the possibility of using moulding sands featuring a relatively low compression strength (about 1 kgF/cm$^2$) and enhancing the metal capacity of the moulds by 15–20%. As a result the economic efficiency of flaskless moulding and the productivity of moulding facilities are considerably increased.

It is expedient that the grips of one chain be arranged opposite to those of the other chain and spring-biased in relation to each other.

Such technical solution enables each stack of flaskless moulds to be reliably clamped with a force required for moving said stack along the stationary bed and mould intactness be ensured while pouring metal thereinto.

According to the invention, each grip is made in the form of a sheet with a corrugated surface facing the oppositely-arranged grip, with sheet edges being turned back towards the chain and the sheet fitted with holes hereinto are introduced the overhanging ends of pins interconnecting chain links.

The provision of a corrugated sheet surface establishes an additional cohesion between the grip surface and the lateral sides of the flaskless moulds during their movement along the stationary bed, while the turned-back edges of the sheet impart it a required rigidity.

According to the invention, each guide is a strap with chamfered ends, said strap being mounted lengthwise on the stationary bed level with the top horizontal section of the chain.

Such a design of the guides provides the possibility of drawing together the top horizontal chain portions above the stationary bed, the result being reliable jacketing of each stack of the flaskless moulds by the grips during the pouring operation.

It is expedient that the strap carry two rows of rollers arranged one above the other, fitted with horizontal pivots and encompassing the chain for supporting it.

The present invention will be better understood from a consideration of a detailed description of an examplary embodiment of a device for handling flaskless moulds to be had in conjunction with the accompanying drawings, in which:

FIG. 3 shows a device for handling flaskless moulds, a top view without sprockets;

A device for handling flaskless moulds comprises a stationary bed 1 (FIG. 1) adapted for arranging flaskless moulds 2 assembled into a horizontal stack. The stationary bed 1 mounts a mechanism or gear 3 for moving the stack of flaskless moulds 2 along said stationary bed 1.

Figure 2:
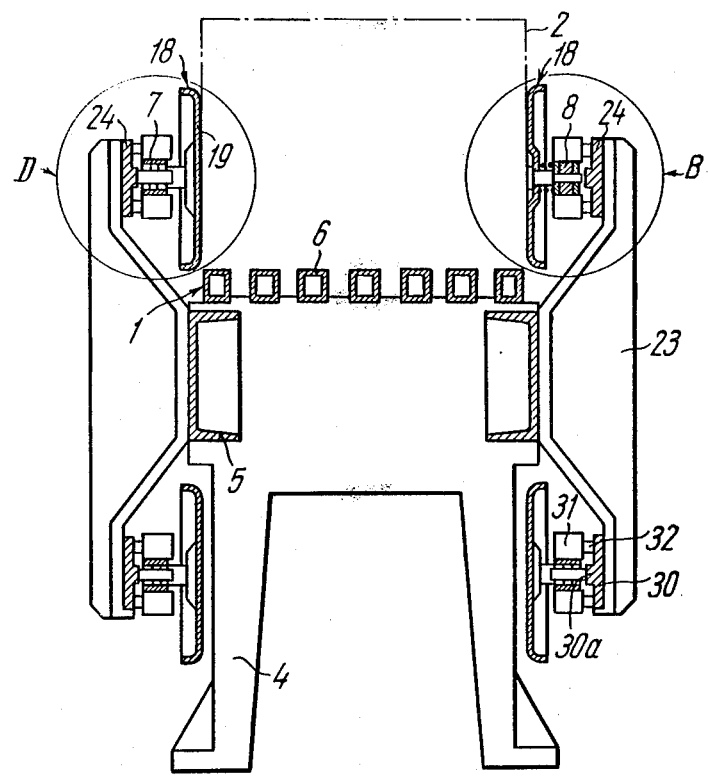
FIG. 2 is a scaled-up section II—II of FIG. 1.

The stationary bed 1 is provided with rests 4 (FIG. 2) arranged mutually parallel in one row and spaced apart from each other. The rests 4 are connected by two parallel beams 5 made of channel iron (as shown in FIG. 2). Fixed on the rests 4 in a longitudinal direction are bars 6 placed so that their top sides are located in one horizontal plane, forming a bearing surface for arranging and moving a stack of flaskless moulds 2 thereon.

The gear 3 for moving a stack of flaskless moulds 2 is made in the form of two sprocket endless chains 7 (FIG. 3) and 8, running from both sides of the stationary bed concordantly thereto.

Figure 1:
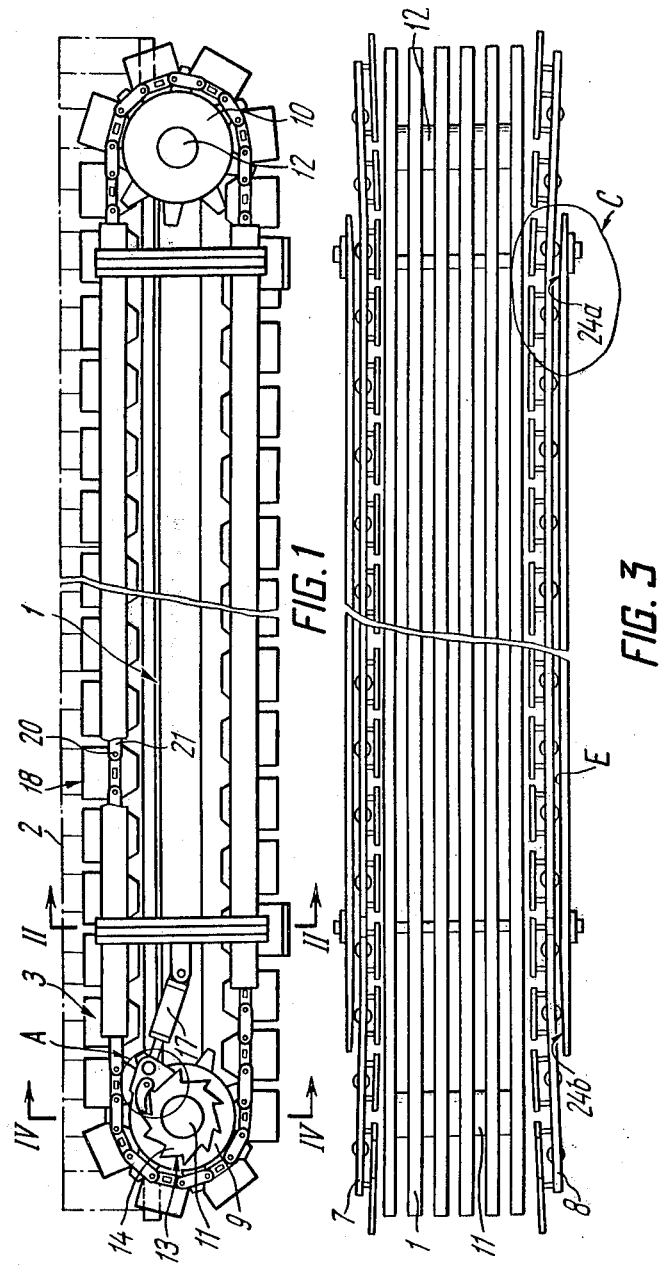
FIG. 1 is a diagrammatic representation of a device for handling flaskless moulds, a front view.

The chains 7 and 8 pass around two pairs of sprockets 9 (FIG. 1) and 10, fastened on shafts 11 and 12 respectively as shown in FIG. 1. The shaft 12 is freely mounted at the ends of the beams 5 from the bed entrance side wherein the flaskless moulds 2 enter said stationary bed 1. The ends of the shaft 12 carry a pair of the sprockets 10 fixed in a known manner. The sprockets 10 are spaced apart at a distance slightly exceeding the width of the stationary bed 1 so that the chains 7 and 8 passing around said sprockets 10 are able to move near said bed 1 with some clearance.

The shaft 11 is mounted freely at the ends of the beams 5 from the opposite side of the stationary bed 1.

Figure 4:
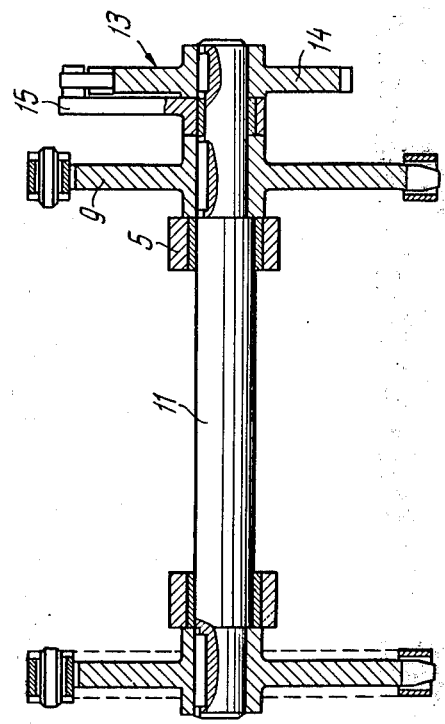
FIG. 4 is a scaled-up view of a section IV—IV of FIG. 1.

On the shaft 11 is fixed a pair of the sprockets 9, as shown in FIG. 4.

Figure 5:
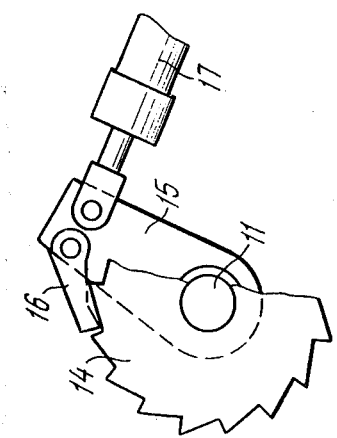
FIG. 5 depicts a scaled-up unit "A" in FIG. 1.

The shaft 11 is a driven one, the sprockets 9 being driving. Mounted at the end of the shaft 9 is a drive, which is a ratchet gearing 13 ensuring periodic movement of the chains 7 and 8. The ratchet gearing 13 comprises a ratchet wheel 14, rigidly fixed at the end of the shaft 11. Put on freely at the same end of the shaft 11 intermediate of the sprocket 9 of the chain 8 and the ratchet wheel 14 is a link 15. The free end of the link 15 carries a hinged pawl 16 (FIG. 5) interacting with the ratchet wheel 14.

In the vicinity of the shaft 11 on the beam 5 is articulated a power cylinder 17 (FIG. 1). The end of the connecting rod of said cylinder 17 is articulated with the free end of the link 15 to actuate the ratchet gearing 13.

According to the invention, the endless chains 7 and 8 carry grips 18 adapted to constantly retain a stack of flaskless moulds 2 during its travel along the stationary bed 1. In this case the grips 18 of the chain 7 being located opposite to those (grips 18) of the other chain 8 (as shown in FIG. 3) and being spring-biased towards each other.

Each grip 18 is made in the form of a sheet 19 (FIG. 6) secured with its central portion on the chain. The sheet 19 is right-angled, its lateral sides being chamfered below its attachment level, as shown in FIG. 1. Such a configuration of the sheet 19 is required to prevent the adjacent sheets 19 from contacting one another as the chain is rolling around the sprockets.

Figure 6:
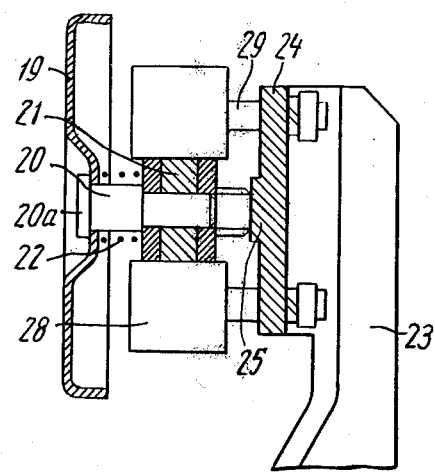
FIG. 6 shows a scaled-up unit "B" in FIG. 2.

The central portion of the sheet at the point of attachment is pressed out towards the chain 7 or 8, to which it is secured, as shown in FIG. 6. A thus-formed recess accommodates attachment parts. Moreover, the edges of the sheet 19 are turned back towards the chain 7 or 8 to ensure a sheet rigidity required for clamping a stack of flaskless moulds with a preset force. The length of the sheet 19 is a function of the diameter of the sprockets 9 and 10 and is selected so as to provide the turning of said chains 7 and 8 around the sprockets 9 and 10.

Each sheet 19 has two holes which are located in the sheet recess and whereinto are introduced two adjacent pins 20 (FIG. 1) connecting links 21 of the chains 7 and 8.

The pin 20 (FIG. 6) is extended, its overhanging end having a larger diameter than the remaining portion of said pin 20. The overhanging end of the pin 20 terminates with a collar 20a, with said overhanging end of the pin 20, mounting the sheet 19, put on by means of one of its holes and a compression spring 22 urging the sheet 19 to the collar 20a. The other end of the spring 22 thrusts against the chain link 21.

The surface of the sheet 19 facing the oppositely-arranged grip 18 is corrugated to ensure a reliable cohesion with the lateral sides of the flaskless moulds 2.

The force of each compression spring 22 is selected so that the total force of the springs 22 acting concurrently on a stack of flaskless moulds 2 will be equal or slightly in excess of the weight of said stack of flaskless moulds 2.

In this case the area of each sheet 19 is selected so that the specific pressure of the grips 18 on the flaskless moulds 2 will be held within 0.05–0.1 kg/cm$^2$.

Thus, the weight of a mould 2, measuring 60×500×200 mm, is 102 kg (taking into account that the mould density is assumed to be 1.7 g/cm$^3$). Then the force required for handling this mould 2 along a stationary bed 1 (with a friction factor of 0.5) will amount to 51 kg. In case of a 200×400 mm sheet 19, the specific pressure applied to the moulds will be equal to 0.06 kg/cm$^2$. When using a moulding sand featuring a 0.6 kg/cm$^2$ compression strength, each mould 2 will have a 10-fold safety factor.

Fixed rigidly on the beams 5 (FIG. 2) are brackets 23. The latter (brackets 23) mount two guides 24 (FIG. 2) running along the stationary bed, level with the top horizontal sections of the chains 7 and 8. The guides 24 disposed from the external side of the chains 7 and 8 are adapted for bringing the above portions of said chains 7 and 8 together above the stationary bed 1.

Figure 7:
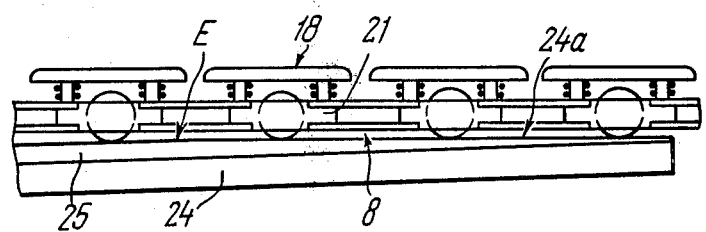
FIG. 7 shows a scaled-up unit "C" in FIG. 3.

Each guide 24 is a strip having a projection 25, running all along the strip in its central (as to its height)

portion, as shown in FIG. 6, with the ends of said strip being fitted with chamfers 24a and 24b, as shown in FIGS. 3 and 7. The surface "E" of the projection 25 is adapted to interact with the corresponding chain 7 or 8.

The surfaces "E" of the projections 25 on the guides 24 with their chamfers 24a and 24b act as bearing surfaces of the chains 7 and 8 are presented to each other. The spacing between these bearing surfaces "E" varies all along the guides 24. In the central portion of the guides 24 this spacing is smaller than on the chamfered portions 24a and 24b, this assisting in bringing together the top horizontal portions of the chains 7 and 8 and hence the oppositely-arranged grips 18 above the stationary bed 1.

Figure 8:
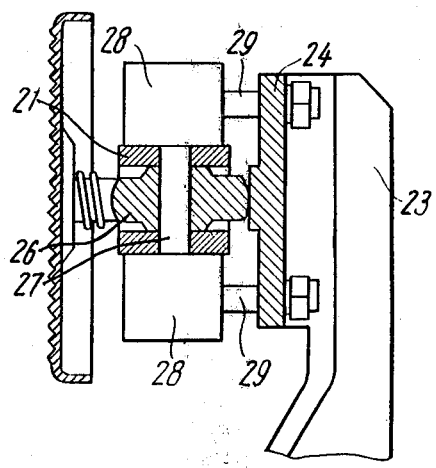
FIG. 8 illustrates a scaled-up unit "D" in FIG. 2 (an inverted view).

Each link 21 of the chains 7 and 8, mounting the grip 18, is provided with a roller 26 (FIG. 8) having a spherical bearing surface and adapted to interact with the guides 24. To this end said link 21 has a longitudinal slot wherein is set up a pivot 27 with the roller 26 put thereon, as illustrated in FIG. 8. The diameter of the roller 26 is slightly greater than the width of the link 21 of the chain 7 or 8, the bearing surface of the roller 26 projecting therefore outside the lateral faces of the link 21 and being provided with the possibility of interacting with the surface "E" of the guide 24, as shown in FIGS. 7 and 8.

From both sides of the projection 25 all along each guide 24 are located two rows of rollers 28 arranged one above the other (FIG. 8) and encompassing the chains 7 and 8. Each roller 28 is mounted freely in a known manner on a horizontal pivot 29 secured with one end in the guide 24. The rollers 28 are adapted to hold the top horizontal portions of the chains 7 and 8 from slackening.

At the level of the bottom horizontal portions of the chains 7 and 8 the bottom ends of the brackets 23 (FIG. 2) mount two straps 30 whose cross-section is similar in configuration to that of the guides 24. The ends of the straps 30 are not chamfered. The straps 30, like the guides 24, carry two rows of rollers 31 arranged one above another from both sides of a projection 30a. Each roller 31 is set up on a horizontal pivot 32 that is fixed in a known manner with one its end in the strap 30. The rollers 31 set up on the strap 30 are adapted for supporting the bottom horizontal portions of the chains 7 and 8 in a vertical direction.

The herein-proposed device for handling flaskless moulds operates in the following manner.

The drive of the endless chains 7 (FIG. 1) and 8 is put into operation. To this end a fluid at a certain pressure is fed into the space of the power cylinder 17, whereupon a cylinder rod moves to the left (in the drawing plane in FIG. 1). As a result, the link 15 (FIG. 5) rotates counter-clockwise. The pawl 16 thrusts against the tooth of the ratchet wheel 14 turning it in the same direction. The ratchet wheel 14 fixed rigidly on the shaft 11 (FIG. 4) rotates said shaft 11 with the driving sprockets rotating together with the shaft 11 in the same direction and moving the chains 7 and 8 (FIG. 3) a distance equal essentially the thickness of one flaskless mould 2. For adjusting the pitch of the chains 7 and 8 use is made of a known device which is not described here in order not to eclipse the nature of the invention. This device delivers a signal for switching over the power cylinder 17.

Said signal for switching over the power cylinder 17 is produced after the chains 7 and 8 have been shifted by a pitch. The rod of the cylinder 17 performs a backward motion, making the link 15 and pawl 16 to return to their initial position. Moving the chains by a next pitch is performed in the above-described manner.

In this way the chains 7 and 8 are moved periodically.

After that the flaskless moulds 2 are fed to the stationary bed 1 (FIG. 1), forming a stack.

During periodic movement of the chains 7 and 8 the rollers 26 are rolling over the surface "E" of the projection 25 (FIG. 3). As the chains 7 and 8 are moving along the sections of the chamfers 24a of the guides 24, said chains 7 and 8 are being brought together with the oppositely-arranged grips 18 converging together with the chains 7 and 8 and being drawn smoothly to the stack of the flaskless moulds 2.

At the end of the chamfers 24a (FIGS. 3 and 7) the grips 18 draw together to such an extent that the sheets 19 under the action of the springs 22 are urged tight with their corrugated surface to the lateral faces of the flaskless moulds 2. The squeezing force exerted by the grips 18 on the moulds 2 is sufficient to overcome friction forces arising when a stack of flaskless moulds 2 is moving along the stationary bed 1. As the moulds 2 are being fed to the stationary bed 1, the stack increases progressively. The moulds 2 clamped by the grips 18 are shifted together with the chains 7 and 8 all along the guides 24 from the chamfers 24a to the chamfers 24b, where the moulds 2 are filled with metal and solidification of castings takes place. The grips 18 support the flaskless moulds 2 constantly from lateral sides, i.e. ensure lateral jacketing of the moulds 2. This protects the flaskless moulds 2 from breakage and hence allows using moulding sands of a rather low compression strength (about 1 kgF/cm$^2$). Moreover, elimination of pulsating loads on the moulds 2 and the provision of a constant support of said moulds 2 from their lateral sides during pouring and crystallization of castings enable the area of a pattern impression in the mould 2 to be considerably increased, i.e. enables the metal capacity of each mould to be brought to the standards adopted for flask moulds. All these factors enhance the economic efficiency of flaskless moulding and add to the productivity of moulding equipment.

At the end of the stationary bed 1 at the sections of the chamfers 24b the chains 7 and 8 are brought apart, with the grip 18 releasing the flasks 2 which are handled to the next operation (knockout).

The rollers 28 protect the chains 7 and 8 from slackening and turning due to the weight of the grips 18.

What we claim is:

1. A device for handling flaskless moulds, comprising: a stationary bed adapted for arranging flaskless moulds assembled into a horizontal stack; and a means for moving a stack of flaskless moulds along said stationary bed comprising: two sprocket endless chains having upper and lower horizontal runs running along both sides of said stationary bed; grips mounted on each of said endless chains for retaining a stack of flaskless moulds during travel along said stationary bed, the grips on one chain always facing the grips on the other chain; guides associated with the upper horizontal runs for top horizontal portions of said endless chains, said guides being positioned so as to provide the drawing together of the top horizontal portions of said endless chains above said stationary bed so that the grips are brought smoothly to and from the stack of the flaskless moulds.

2. A device of claim 1, wherein the grips are spring-biased in relation to each other.

3. A device of claim 2, wherein said chains are formed of chain links and pins interconnecting the chain links and wherein each grip is made as a sheet with a corrugated surface facing the oppositely-arranged grip, with sheet edges being turned back towards the chain carrying said grip and with the sheet being fitted with holes whereinto are introduced overhanging ends of pins interconnecting chain links.

4. A device of claim 1 wherein each guide is a longitudinally-extending strap mounted on said stationary bed in such manner that said strap is spaced from the side of said bed and level with the top horizontal portion of the chain, said strap having chamfered ends.

5. A device of claim 4, wherein the strap carries two rows of rollers for supporting the chain arranged one above the other on horizontal pivots and encompassing the chain.

6. A device for handling flaskless moulds, comprising:
   a stationary bed adapted for arranging flaskless moulds assembled into a horizontal stack; and
   a means for moving a stack of flaskless moulds along said stationary bed comprising:
     two sprocket endless chains having chain links interconnected by pins running along both sides of said stationary bed;
     grips mounted on said endless chains for retaining a stack of flaskless moulds during their travel along said stationary bed each of said grips being formed as a sheet with a corrugated surface, edges of the sheet being turned back towards the chain carrying said grip and the sheet being fitted with holes whereinto are introduced overhanging ends of pins interconnecting chain links; and
     guides for the top horizontal portions of said endless chains positioned so as to provide the drawing together of the top horizonal portions of said endless chains above said stationary bed so that the grips are brought smoothly to and from the stack of the flaskless moulds.

* * * * *